Patented June 6, 1933

1,912,511

UNITED STATES PATENT OFFICE

FRANCIS L. CARSON, OF SAN FRANCISCO, CALIFORNIA, ASSIGNOR TO THE PACIFIC LUMBER COMPANY, OF SAN FRANCISCO, CALIFORNIA, A CORPORATION OF MAINE

ARTIFICIAL BOARD AND METHOD OF PRODUCING SAME

No Drawing. Application filed January 7, 1931. Serial No. 507,295.

The present invention relates to an improved process of producing artificial boards. My invention has particular reference to a process of treating vegetable fibres with bituminous emulsions for the purpose of cementing or combining the said fibres to a unitary mass having desirable physical properties, as hereafter more fully explained. My invention further contemplates the use of starch in the bituminous emulsion for purposes which will presently be explained.

I have discovered that emulsions of asphalts, tars, pitches and bitumens with colloidal or semi-colloidal starch solutions act as an ideal felting medium for hair-like fibres of wood and bark, obtained by shredding the same, and upon the subsequent removal of the moisture from the mat or sheet an article is obtained which is permanently waterproof.

I have discovered that the board such as I have described above is low in thermal-conductivity and resilient to applied pressure, in that being slightly compressed and the pressure removed, the board expands to the original volume. It will thus be observed that expansion joints may be made from the board obtained by practicing my invention.

I have discovered that the boards of hairlike fibre treated in this manner, by emulsions of asphalt and colloidal starch solutions, upon being dried and subsequently heated and compressed under heavy pressure can be formed into hard-leather-like sheets, suitable for roofing, pavements, iron and wood pipe coverings and water-resisting and liquid-resisting purposes of all kinds.

I select the tar, pitch, asphalt or bitumen required, the requirements being dependent upon the qualities desired in the finished product as to density, weight per cubic foot, resistance to the transmission of heat, air, water or other liquid, resistance to fracture and impact, and resistance to the action of heat.

The range of tars, pitches, asphalts and bitumens from which to select the required product is wide and varied, but though they vary widely as to ductility, viscosity, penetration and melting point, they are all essentially alike in the characteristics of liquefying when subjected to heating and possessing in a liquid state the surface covering properties of oils.

I emulsify these viscous materials, outlined above with water by any of the commonly known methods, incorporating with the water of the emulsion a predetermined quantity of vegetable starch in colloidal or semi-colloidal solution, having placed the starch in that condition by the usual boiling methods.

The quantity of starch required varies between one-half of one percent and ten percent of the whole solution, dependent upon the stiffness required in the resultant product, the greater quantity of starch present giving brittle rigidity to the final product, while the lesser quantity only slightly modifies and strengthens the plastic quality of the sheet or mat wherein asphaltic or bituminous material is used alone as a binder.

In carrying my invention into effect, I may first procure bark from trees such as Sequoia and proceed to obtain the same in shredded condition by any convenient method, the shredding operation per se forming no part of the present invention. I obtain the shredded hair-like wood fibre in lengths according to the requirement of the finished product I aim to produce. I find that short, fine fibres tend to produce dense mats of maximum strength, while coarse, long fibre tends to produce light springy mats of less inherent tensile strength. I then prepare an emulsion of a bituminous substance in water, using for example a bituminous material such as pitch, tar or asphalt to which has been added a quantity of vegetable starch.

With regard to the incorporation of the vegetable starch it is pointed out that the starch is, as usual, first thoroughly moistened with cold water to form a paste. This paste is then diluted by adding further quantities of water and the mixture is then boiled until the starch goes into colloidal or semi-colloidal solution. The asphalt is added to this starch solution and the mixture is emulsified in any known manner.

The hair-like fibre is introduced into the emulsion prepared as above and thoroughly mixed with the same by stirring or other convenient means. When a homogeneous mixture of fibre and emulsion has been obtained the mixture is run onto a screen where the excess liquid is allowed to filter through the screen, leaving on the screen surface a mat of wood hair-like fibre, saturated with the emulsion. The bituminous substance serves to cement or combine the fibres to form a unitary structure, while the starch serves to strengthen the bark fibres as well as to assist in the cementing of the said fibres. The resultant mat is dried, yielding a rather spongy board. I manufacture a pressed board by subjecting the above dried spongy board to an elevated pressure ranging from 400 to 2000 lbs. per square inch and temperatures ranging from 150° F. to 325° F. The product is characterized by high tensile strength, low heat and electrical conductivity, and imperviousness to water.

The following specific examples of the manner of preparing my emulsion-fibre mix are given below. It is to be distinctly understood, however, that the proportions and conditions set forth below are in no wise limiting on my invention. The parts are by weight.

Example I

I dissolve 16.6 lbs. of Richfield 30 penetration, air refined asphalt in 32 lbs. of benzol. I dissolve 2.4 lbs. of corn starch in 81.4 lbs. of water. I then thoroughly mix the benzol solution and the starch solution until complete homogeneity is attained. The benzol is removed by distillation, the residue being a stable emulsion of the asphalt in water type. The above operations, except the distillation, are carried out at normal atmospheric temperatures. This emulsion is used as a conveying medium for 10 lbs. of raw vegetable fibre having an average length of approximately three inches. A board is manufactured by conveying the fibre containing suspension to the screen of a board machine where the board is formed and the excess conveying medium is withdrawn from beneath the screen and re-used to convey additional fibre. The board formed on the said screen is removed to a drying chamber where the drying operation is continued to remove all of the water mechanically held in the board and thus the same is rendered bone-dry. This board has a maximum weight of 20 lbs. per cubic foot and is moisture-proof insofar as the individual fibres are concerned. That is to say, the individual fibres will not permit ingress of water into the interior thereof although water may pass between the individual fibres through the board.

Example II

One hundred pounds of "D" grade asphalt which is 99.8 percent pure bitumen and which has the penetration of 55 is heated to 325° F. At this temperature 0.5 lbs. of oleic acid are introduced into the molten asphalt and the mixture stirred. The oleic acid-containing asphalt is cooled to 212° F.

In a separate container containing 100 lbs. of water, I dissolve 0.5 lbs. of caustic soda and heat the solution to 212° F.

I pour the above asphalt which is at a temperature of 212° F. into the caustic soda solution at the same temperature while violently agitating the mixture. Emulsification ensues immediately. The said emulsion has a viscosity of approximately 1 at normal atmospheric temperature.

To this emulsion, there is added 100 lbs. of a 5 percent starch solution. This emulsion is stable against dilution and evaporation of water if the latter is that which would occur at ordinary temperatures during a period of six months. This mixture of emulsion and starch solution is used as a conveying medium for shredded raw vegetable fibre.

A board is formed as in the preceding example.

The product obtained by this example is waterproof in a sense that when the product is emersed in cold water, it does not swell. In the preceding example, the product does swell in water but does not swell in contact with moisture-laden air.

Example III

The asphalt emulsion may be prepared as in Example II. The raw vegetable fibres are suspended in this emulsion and the board formed as in Example I. It will be noted that starch is omitted in this modification and that the emulsion has an asphalt content of 50 percent. This emulsion may be used as a suspending medium for raw vegetable fibres in the ratio of one part of fiber to 80 parts of emulsion by weight. The board or sheet produced by the method set forth in this example, after having been dried and subjected to pressure and heat as previously indicated may be used as a roofing material, a pipe covering, tank lining and acid-proof container walls, leather-like pavement for miniature golf, tennis courts, the region between and adjacent to street railway tracks and for covering surfaces of ship decks and warehouse floors.

It will be readily apparent to one skilled in the art that the process of forming sheets or mats from the above emulsions and raw vegetable fibre may be carried out in numerous ways. Almost any of the board making machines now on the market will lend themselves to the expeditious and economical handling of these mixtures and the production of the artificial board.

Raw vegetable fibres of any source may be used in my process since the viscous solutions described above will serve to convey them to a board-forming machine and will further serve to cause combination and cementation of the fibres to form a unitary structure. Hence, I may use raw shredded scrap wood or bark from cedar, ash, birch or other trees and I may also use raw hemp, straw, ramie and grasses in my process. By raw vegetable fibre, I comprehend undigested non-chemically treated fibre.

I claim:—

1. The process of producing a board which comprises introducing shredded raw vegetable fibres into a bituminous emulsion and forming a sheet of any desired thickness from the mixture.

2. The process of producing a board which comprises introducing shredded raw vegetable fibres into an asphaltic emulsion containing vegetable starch and then forming a sheet of any desired thickness from the mixture.

3. The process of producing a board which comprises shredding redwood bark, introducing the shredded bark into an asphaltic emulsion containing starch and then forming a sheet of any desired thickness from the mixture.

4. The process of producing a board which comprises shredding redwood bark to produce fibres of a length not greater than three inches, introducing the said fibres into an asphaltic emulsion containing starch and then forming a sheet of any desired thickness from the mixture.

5. As a new article of manufacture, a board comprising raw vegetable fibres cemented together by means of a bituminous binder.

6. As a new article of manufacture, a board comprising shredded raw vegetable fibres cemented together by means of a bituminous binder and containing starch distributed throughout the mass serving the purpose of increasing the tensile strength of the said sheet.

7. As a new article of manufacture, a flexible board comprising shredded raw vegetable fibres cemented together by means of a bituminous binder and having low heat conductivity.

8. As a new article of manufacture, a flexible board comprising shredded raw vegetable fibres cemented together by means of a bituminous binder and containing starch distributed throughout the mass serving the purpose of increasing the tensile strength of the said sheet, the said sheet having a low heat conductivity.

9. A heat resistant and waterproof board comprising shredded raw vegetable fibres cemented together by a bituminous binder, formed by subjecting the emulsion treated raw vegetable fibres to heat and pressure.

10. As a new article of manufacture, a flexible board comprising raw redwood bark fibres cemented together by means of a bituminous binder and containing starch distributed throughout the mass serving the purpose of increasing the tensile strength of the said board, the said board having a low heat conductivity.

In testimony whereof I affix my signature.

FRANCIS L. CARSON.